US012650264B2

US 012650264B2

(12) United States Patent
Dahmen et al.

(10) Patent No.: US 12,650,264 B2
(45) Date of Patent: Jun. 9, 2026

(54) DEVICE FOR MONITORING AN APPARATUS FOR INDUCTION HEATING OF A METAL MATERIAL, METHOD FOR AUTOMATIC LOADING AND CONTROL SYSTEM

(71) Applicant: Otto Junker GmbH, Simmerath/Lammersdorf (DE)

(72) Inventors: Christof Dahmen, Stolberg (DE); Wilfried Schmitz, Eschweiler (DE)

(73) Assignee: Otto Junker GmbH, Simmerath/Lammersdorf (DE)

( * ) Notice: Subject to any disclaimer, the term of this patent is extended or adjusted under 35 U.S.C. 154(b) by 0 days.

(21) Appl. No.: 18/844,653

(22) PCT Filed: Mar. 6, 2023

(86) PCT No.: PCT/EP2023/055559
§ 371 (c)(1),
(2) Date: Sep. 6, 2024

(87) PCT Pub. No.: WO2023/169981
PCT Pub. Date: Sep. 14, 2023

(65) Prior Publication Data
US 2025/0189230 A1      Jun. 12, 2025

(30) Foreign Application Priority Data

Mar. 9, 2022      (DE) ..................... 10 2022 105 538.8

(51) Int. Cl.
*F27D 21/02*          (2006.01)
*F27D 19/00*          (2006.01)
(Continued)

(52) U.S. Cl.
CPC ............. *F27D 21/02* (2013.01); *F27D 19/00* (2013.01); *G01F 23/292* (2013.01);
(Continued)

(58) Field of Classification Search
CPC .. F27D 21/02; F27D 19/00; F27D 2019/0059; F27D 2019/0075; G01F 23/292; G08B 21/182
(Continued)

(56) References Cited

U.S. PATENT DOCUMENTS 5,479,437 A      12/1995  Hayashi
5,528,620 A       6/1996  Fujita et al.
(Continued)

FOREIGN PATENT DOCUMENTS

DE          2745251 C2      7/1986
DE          4329509 A1      3/1994
(Continued)

OTHER PUBLICATIONS

KR20210065596, Choi et al. ,Apparatus and Method For Controlling Charging Amount of Sintering Material, Jun. 4, 2021 (Year: 2021).*
(Continued)

*Primary Examiner* — Jessee R Roe
*Assistant Examiner* — Michael Aboagye
(74) *Attorney, Agent, or Firm* — The Webb Law Firm

(57)          ABSTRACT

An apparatus for monitoring an apparatus for the inductive heating of a metal material, including a detection device and an evaluation device. In order to automate the loading of the inductive heating apparatus with bulk material or metal material, according to the invention the detection device is an optical sensor for detecting distance and the evaluation device is designed to determine, on the basis of the distance detected by the detection device, the fill level of the inductive heating apparatus and to output a corresponding signal, the signal being suitable for further use in a control process for the feeding of metal material to the inductive heating apparatus. The invention also relates to a method for auto- (Continued)

matically loading an apparatus for the inductive heating of a metal material and to a control system for an apparatus for the inductive heating of a metal material.

8 Claims, 5 Drawing Sheets

(51) Int. Cl.
*G01F 23/292* (2006.01)
*G08B 21/18* (2006.01)

(52) U.S. Cl.
CPC .... *G08B 21/182* (2013.01); *F27D 2019/0059* (2013.01); *F27D 2019/0075* (2013.01)

(58) Field of Classification Search
USPC ........ 266/100, 242, 249, 252; 373/150, 151, 373/152, 145, 148, 149
See application file for complete search history.

(56) References Cited

U.S. PATENT DOCUMENTS

| | | | | |
|---|---|---|---|---|
| 7,336,692 B2 * | 2/2008 | Lazor | ....................... | F27B 14/14 373/149 |
| 7,926,301 B2 * | 4/2011 | Johnson | .................. | C03B 3/005 65/29.17 |
| 10,175,040 B2 * | 1/2019 | Bonin | .................. | G01B 11/026 |
| 11,788,161 B2 * | 10/2023 | Prabhu | .................. | C21C 5/5247 266/99 |
| 2020/0340071 A1 | 10/2020 | Prabhu et al. | | |
| 2023/0113814 A1 * | 4/2023 | Inoue | ....................... | F27D 3/10 414/18 |

FOREIGN PATENT DOCUMENTS

| | | | | | |
|---|---|---|---|---|---|
| DE | 4435764 | A1 | | 4/1995 | |
| DE | 19845528 | A1 | | 10/1999 | |
| DE | 102011014894 | A1 | | 9/2012 | |
| JP | 2005096809 | | * 4/2005 | ..... | F27D 2019/0003 |
| KR | 1020130104273 | A | | 9/2013 | |
| KR | 20210065596 | | * 6/2021 | ............ | C21B 5/008 |
| WO | 2021182218 | A1 | | 9/2021 | |

OTHER PUBLICATIONS

JP2005096809, Ugajin et al. ,Method of Detecting Bridge in Material Feeder, Apr. 14, 2005 (Year: 2005).*

* cited by examiner

DEVICE FOR MONITORING AN APPARATUS FOR INDUCTION HEATING OF A METAL MATERIAL, METHOD FOR AUTOMATIC LOADING AND CONTROL SYSTEM

CROSS-REFERENCE TO RELATED APPLICATIONS

This application is the United States national phase of International Application No. PCT/EP2023/055559, filed Mar. 6, 2023, and claims priority to German Patent Application No. 10 2022 105 538.8, filed Mar. 9, 2022, the disclosures of which are hereby incorporated by reference in their entireties.

BACKGROUND OF THE INVENTION

Field of the Invention

The invention relates to a device for monitoring a device for inductive heating of a metal material with a detection device and with an evaluation device, as well as to a method for automatically loading a device for inductive heating of a metal material. In addition, the invention relates to a control system for a device for induction heating of a metal material with a device of the type mentioned above and with a control unit.

Metal materials can be processed by melting, among other things. For example, it is common to melt iron and additives to produce cast iron with a specific alloy. A common means of melting a metal material in a controlled manner is induction heating, in particular using a crucible induction furnace. A classic coreless induction furnace has a holding chamber in the form of a crucible for holding a metal material to be melted and a coil, also known as an inductor, through which an alternating current can flow. The alternating current causes an electromagnetic field inside the coil, which in turn causes eddy currents in a metal material received by the crucible. These eddy currents arise due to the electrical conductivity of the metal material and, according to Joule's law, lead to heating and thus also to melting of the metal material.

In general, a material to be melted is filled into the receiving chamber of the coreless induction furnace in the form of so-called bulk material, for example as loose pieces of scrap or larger blocks of material. The bulk material may have been dried before filling. Depending on the packing density of the bulk material, the volume of the receiving chamber is at least partially filled. As the bulk material has not yet melted, the maximum holding weight of the coreless induction furnace is not reached. For example, a coreless induction furnace may have a maximum holding weight of approx. 8 tonnes and the receiving chamber can initially be filled with, for example, approx. 2 tonnes of bulk material. By supplying energy via the coil, the bulk material melts and the fill level or the height to which the receiving chamber is filled with bulk material decreases.

As the fill level drops, the receiving chamber should then be refilled with more bulk material, which in turn melts. This is repeated until the maximum charging weight of the coreless induction furnace, usually recommended by the furnace manufacturer, is reached. For this refilling of the receiving chamber, it is known to drive a charging trolley loaded with a quantity of bulk material corresponding to the maximum holding weight of the coreless induction furnace up to the coreless induction furnace. Monitoring the actual fill level of the coreless induction furnace and transferring a suitable quantity of bulk material from the charging trolley to the receiving chamber of the coreless induction furnace is usually carried out by a person.

For example, a person usually stands next to the coreless induction furnace and controls the charging process in its immediate vicinity, where high temperatures prevail. Human control of charging in this way is therefore relatively dangerous.

In the context of the invention, the terms "filling" or "refilling", "loading" are understood to mean an increase in the quantity of a material received by the receiving space of a device for induction heating, without this necessarily being a complete filling of the receiving space. This means that the receiving chamber can hold any amount of metal material during a filling process, from the empty state to the completely filled state of the receiving chamber.

In addition, when charging a coreless induction furnace, the metal material to be melted may get stuck or stick together and not sag, thus preventing the fill level from dropping as intended. This can occur, for example, if a solidified, non-metallic accompanying phase or "slag" solidifies on the melt and/or "freezes" in contact with the refilled, still solid metal material. In this case, the interlocked or bonded material forms a layer on the molten metal material that differs in terms of its packing density and/or composition from the rest of the material received by the device for inductive heating.

A layer of this type separates the metal material below the layer, which is at least partially molten, from the still solid metal material added above the layer. An air cushion may form between the molten metal and the layer, creating a thermal barrier between the molten metal and the refilled material that is still to be melted. As a result, the upper, still solid metal material is at least partially thermally insulated from the lower melt and melts comparatively slowly.

In technical jargon, this layer system is referred to as a "bridge" and its formation as "bridging".

If the bridge is located above the area of the device for inductive heating's receiving chamber to which the coil is in direct contact, the bridge will melt even more slowly and the power induced by the coil will only reach the already melted metal material below the bridge. This can lead to severe overheating of the molten metal and rapid washing out/wear of the refractory material in the receiving chamber of the device for inductive heating, even to its destruction. If the bridge seals the receiving chamber of the device for inductive heating airtight and completely separates the melt from the environment, hazardous gases such as carbon monoxide (e.g. through contact with the $SiO_2$ refractory lining) can no longer escape. Furthermore, additional temperature-induced expansion of the melt can cause the pressure under the bridge to rise. If the pressure is suddenly released, for example by an attempt to open the bridge mechanically or with an oxygen lance, an explosion can occur.

This means that the phenomenon of bridging-if recognized too late-represents a high safety and economic risk.

Description of Related Art

The publication DE 43 29 509 A1 discloses a protective device for an induction furnace, whereby bridging is determined on the basis of temperature values detected by a plurality of temperature sensors. It is also known from KR 2013 0104273 A to detect the fill level in a crucible using laser beams, ultrasonic waves or visualization. The publication WO 2021/182218 A1 discloses a distance sensor for monitoring the fill level in the crucible by means of microwave radiation.

SUMMARY OF THE INVENTION

Against this background, the present invention is based on the task of improving the charging of a device for induction heating of a metal material, in particular making it safer and more reliable.

According to the invention, this task is solved by a device for monitoring a device for inductive heating of a metal material with a detection device and with an evaluation device, wherein the detection device is an optical sensor for detecting a distance, wherein the detection device is a LIDAR sensor, the detection device being configured to emit beams in the ultraviolet, infrared or visible range of light and to determine a distance value for the distance to be measured at a specific measurement time on the basis of the transit time of the measurement pulse between emission and reception after reflection, and wherein the evaluation device is configured to determine a fill level of the device for inductive heating on the basis of a distance detected by the detection device and to output a corresponding signal, wherein a plurality of distance values corresponding to a plurality of distances detected at the same time are taken into account to detect bridging in the metal material received by the induction heating device, and the signal being suitable for further use in a control process for the supply of metal material to the device for inductive heating.

With the device according to the invention, the fill level of a device for induction heating or the sinking behaviour of a filled metal material can be monitored during the filling of the device for induction heating and the corresponding information can then be used to automatically control the filling of the device for induction heating. Overall, the device according to the invention represents an essential component for optimized control of a device for inductive heating, both in terms of operational safety and in terms of reliability and productivity.

A device for induction heating of a metal material within the meaning of the invention can, for example, be a crucible induction furnace, in particular a medium-frequency crucible furnace configured for inductive energy transfer to a received metal material. Thus, the device for inductive heating preferably has a coil wound around a receiving space, for example a vessel, preferably a crucible, for receiving a metal material, which is configured to induce electromagnetic eddy currents in the metal material. However, the term "device for inductive heating" also includes any device adapted for heating a metal material by induction of an electromagnetic field.

The detection device is an optical sensor for detecting a distance. The detection device is a LIDAR sensor ("Light Detection And Ranging") and is configured to emit rays in the ultraviolet, infrared or visible range of light and to determine a distance to an object via the transit time of the rays reflected by the object surface. The detection device is configured to determine a distance value for the distance to be measured at a specific measurement time on the basis of the transit time of the measurement pulse between emission and reception after reflection.

By designing the detection device as an optical sensor, existing devices for inductive heating can be easily and cost-effectively retrofitted. In particular, the design of the detection device as a LIDAR sensor offers, among other things, the possibility of an area-detecting (2D) distance measurement for monitoring a fill level. In addition, a LIDAR sensor is generally suitable for industrial applications and has a low sensitivity to smoke, dust particles, ambient gas composition, extreme temperatures, and mechanical influences.

A LIDAR sensor, for example, is particularly advantageous compared to laser devices for the present application, as it enables a distance to a surface to be detected, whereas laser devices can rather detect a distance to a point. In addition, a LIDAR sensor is advantageous compared to a radar device, for example, thanks to the possibility of detection at an angle inclined to the surface to be detected, because accurate detection by means of a radar device usually has to be carried out perpendicular to the surface to be detected.

In addition, commercially available LIDAR sensors generally have an analogue/digital interface that facilitates integration into existing control software of a device for inductive heating. The detection device can be connected to the evaluation device by cable or via a wireless communication link.

Furthermore, the detection device can be configured to filter out attenuation and interference pulses caused by the atmosphere, e.g. by smoke or fog on the light path of the emitted and reflected measurement pulse, via an integrated dynamic adjustment of the measurement sensitivity. This means that the detection device can also be used in dynamically changing environments.

Preferably, the detection device is configured to detect distances of up to 40 m, whereby the value for a maximum detectable distance depends on the refractive index of the surface on which the measuring pulse is scattered. In addition, the detection device can be configured to detect a distance to a surface with a temperature of up to 1200° C. and to be operated at temperatures in the range from −25° C. to 200° C., in some cases by adding corresponding accessories.

The detection device is configured for time-resolved detection of a distance. In the present case, the term "time-resolved detection" covers any process in which at least two detections are carried out with a time delay relative to each other. Preferably, the detection device is configured to carry out several detections, spaced apart in time by a predetermined time interval, over a predetermined period of time and to output a distance value corresponding to the detected distance for each detection. The predefined time period can be automatically adjustable, repeatable, relatively short for the purposes of a random sample, for example less than one hour and/or unlimited. Alternatively or additionally, the time duration may correspond to the duration for which the device for inductive heating is operated to melt a batch to its nominal weight.

Furthermore, the detection device is configured to output distance values that each correspond to a detected distance. Preferably, a distance value corresponds to a distance detected in the course of time-resolved detection at a single point in time. This way, successive distance values can be used to monitor the temporal development or development of a distance over time in real time and/or to track it retrospectively. It is also preferable that the detection device is configured for outputting distance values as machine-readable information.

The device according to the invention has an evaluation device. This preferably has a processor, a data memory and a computer code, the execution of which on the processor causes the distance values output by the detection device to be evaluated. In addition, the evaluation device is configured to determine a fill level of the device for inductive heating on the basis of a distance detected by the detection device. Here, the evaluation device can use further information, such as an angular position of the detection device relative to a reference position on the device for inductive heating or a distance between the detection device and a reference position on the device for inductive heating, in order to combine or supplement this with the detected distance.

In addition, the evaluation device is configured to output a signal that contains information about the fill level of the device for inductive heating. The signal is preferably a coded unit whose information content corresponds to the evaluation result. The signal is suitable for further use in a control process for the supply of metal material to the device for inductive heating. In particular, the signal is suitable for being decoded by a downstream computer unit and its information content taken into account for a timely adjustment of the intended bulk quantities for filling the device for inductive heating.

In a first embodiment of the device for monitoring a device for inductive heating, the detection device is configured for time-resolved detection of a distance and output of corresponding distance values and the evaluation device is configured to track a temporal development of the fill level on the basis of distance values output by the detection device and to adapt the signal accordingly.

This allows the supply of bulk material to be controlled or regulated in real time, thereby increasing both the operational reliability and the productivity of the device for inductive heating or a coreless induction furnace.

Preferably, the evaluation device is configured to continuously output a signal that contains information about the current fill level of the device for inductive heating. In this way, the supply of metal material or bulk material can also be controlled or regulated continuously.

In a further embodiment of the device for monitoring a device for inductive heating, the fill level at a specific point in time corresponds to a distance between a reference position fixed relative to the device for inductive heating and a position on the free surface of the metal material received by the device for inductive heating at the specific point in time.

In this way, the fill level or the level to which a receiving chamber of the device for inductive heating is filled with metal material to be melted can be monitored.

The reference position, which is fixed relative to the device for inductive heating, is preferably a point on the wall or on an edge of a receiving space of the device for inductive heating. In particular, the reference position can be a point on the upper edge of an induction crucible of the device for inductive heating.

In addition, the position on the free surface of the metal material received by the device for inductive heating at a certain point in time is preferably a point or an area on the surface of the metal material filled in. By regularly detecting the distance between the edge of the crucible and the surface of the metal material filled into the crucible, the sinking behaviour of the metal material can be observed and thus bridging can be detected in good time.

Furthermore, the detection device is preferably configured to carry out an areal distance measurement, whereby the detection device emits measuring pulses that hit the free surface of the metal material received by the device for inductive heating over an area. Such a procedure results in a measuring spot diameter on the reflective, free surface of the filled metal material, the radius or extent of which depends on the distance between the detection device and the free surface hit.

Furthermore, the detection device is preferably configured to emit a measuring pulse with a light cone of at least 2°, preferably of at least 5°, more preferably of 6°+1°. In addition, the detection device is preferably capable of emitting measurement pulses with a frequency in the range from 2 Hz to 141 Hz, preferably in the range from 2.2 Hz to 140.88 Hz. The emitted measuring pulse can have a wavelength in the infrared range.

In a further embodiment of the device for monitoring a device for inductive heating, the evaluation device is configured to access at least one preset and/or detected value for an operating parameter of the device for inductive heating, and the evaluation device is configured to recognize bridging in the metal material received by the device for inductive heating, taking into account distance values output by the detection device and the at least one preset and/or detected value for an operating parameter of the device for inductive heating.

By taking into account both the temporal development of the fill level in the device for inductive heating and other factors that have an influence on the melting process of the metal material received by the device for inductive heating, it is possible to reliably ensure that bridging is detected.

Preferably, the evaluation device has a communication interface for accessing operating parameter values, via which the evaluation device is connected to a control system of the device for inductive heating.

Operating parameters can be preset for the operation of the device for inductive heating, for example set values for a temperature, power, weight or similar. Alternatively or additionally, actual values for these operating parameters can be recorded during a melting process. The device for inductive heating can be adaptively controlled or regulated based on the behaviour between setpoints and actual values.

In a further embodiment of the device for monitoring a device for inductive heating, the at least one preset and/or detected value for an operating parameter of the device for inductive heating is a value for a weight, in particular a weight for a receiving chamber of the device for inductive heating loaded with the metal material, a power consumption of the device for inductive heating or a power consumption of the device for inductive heating from the power supply network, a weight for a metal material received by the device for inductive heating, a temperature, in particular a temperature for a metal material received by the device for inductive heating, or an energy already supplied by the device for inductive heating to a metal material received by the device for inductive heating.

By taking into account at least one of these operating parameters or its preset setpoint value or its detected actual value, the determination of bridging can be carried out with increased reliability.

An energy to be supplied for melting the metal material or a ratio between an energy supplied and an energy to be supplied can be calculated from the weight of a metal material received by the receiving chamber of the device for inductive heating.

In a further embodiment of the device for monitoring a device for inductive heating, the signal output by the evaluation device is suitable for further use by a warning device and the warning device is designed to output a warning signal if the signal contains information about a positive detection of bridging.

This way, the operating personnel can be informed that a bridge has formed and can take appropriate safety measures in good time to prevent injuries and/or damages.

The warning device is preferably designed to emit a warning signal in the form of an alarm or a visual display.

In a further embodiment of the device for monitoring a device for inductive heating, the detection device is arranged at a conveying device, in particular at a splash guard of a conveying device for feeding metal material to the device for inductive heating.

Thus, the detection device can have a direct light path to the free surface of the metal material received by the device for inductive heating. Generally, the splash guard of the conveying device is arranged above an upper opening of the receiving space of the device for inductive heating, so that the entire depth of the receiving space can be detected by the claimed arrangement of the detection device. In addition, this arrangement is advantageous both for retrofitting an existing device for inductive heating with an easily accessible mounting position and for maintenance of the detection device.

Furthermore, cables for connecting the detection device to downstream devices, such as the evaluation device, can be fed through the ceiling of the splash guard and laid in a cable duct. This protects the cables against the temperatures that occur in the inductive heating device. A device for the power supply and control of the detection device can be attached to one side of the transport device.

The above task is also solved in a method for automatic loading of a device for the inductive heating of a metal material, wherein beams in the ultraviolet, infrared or visible range of light are emitted by a detection device configured as a LIDAR sensor and a distance is detected with time resolution, wherein a distance value for the distance to be measured is determined at a specific measurement time point on the basis of the transit time of the measurement pulse between emitting and receiving after reflection, wherein corresponding distance values are output, wherein a signal containing information about a fill level of the device for inductive heating is output on the basis of the distance values, wherein a plurality of distance values corresponding to a plurality of distances detected at the same time are taken into account to detect bridging in the metal material received by the induction heating device, and wherein the supply of metal material to the device for inductive heating is controlled or regulated as a function of the information about a fill level.

This method offers the same advantages as the device according to the invention for monitoring a device for inductive heating of a metal material. In particular, the operational safety for the operating personnel and for the system itself can be improved by controlling or regulating the supply of metal material or bulk material. Plant availability and costs due to damage caused by bridging can also be optimized by the method according to the invention.

The terms "control" or "regulation" are understood here to mean adaptive control, whereby the control of, for example, a conveyor device for feeding metal material to a device for induction heating is adapted depending on the detection of bridging.

In a first embodiment of the method, at least partial loading of the device for inductive heating by a transport device, in particular by a charging trolley or by a movable transport chute, is at least temporarily prevented or continued as a function of the information about a fill level of the device for inductive heating.

This allows a charging process to be at least partially automated. In particular, a charging process adapted to the actual, current fill level of the device for inductive heating can be carried out without the presence of operating personnel in the immediate vicinity of the device for inductive heating.

The charging trolley is preferably a trolley that can be moved on rails. The movable transport chute can be a vibrating trough that can be moved in the direction of the device for inductive heating.

In a further embodiment of the method, the at least partial loading is started or resumed when the fill level falls below a predetermined lower limit value, and/or the at least partial loading is paused or stopped when the fill level exceeds a predetermined upper limit value.

This means that a melting process can be optimized in advance by determining upper and lower limit values. In particular, the charging of the device for inductive heating can be carried out automatically and without regard to the packing density of the bulk material.

The lower limit value and the upper limit value are preferably each defined in relation to a fixed reference position relative to the device for inductive heating. To determine whether the level has fallen below or exceeded the limit, the evaluation device is preferably configured to call up the lower limit value or the upper limit value and compare the current fill level with it.

In the method, a plurality of distance values corresponding to a plurality of distances detected at the same time are taken into account to detect bridging in the metal material received by the device for inductive heating.

This allows the temporal development of the sinking of an area of the free surface of the recorded metal material to be observed. This can be achieved by a measuring pulse with a light cone hitting the free surface of the recorded metal material and thus observing a measuring surface. Alternatively or additionally, several measuring pulses can be emitted simultaneously and sent in the direction of the free surface of the recorded metal material in order to observe the sinking behaviour of several positions on the free surface of the recorded metal material.

In a further embodiment of the method, it is determined on the basis of the distance values whether the fill level essentially decreases, remains constant or increases over a predetermined period of time, and bridging in the metal material received by the device for inductive heating is recognized on the basis of the development of the fill level over time.

A characteristic sign of the presence of a bridge or bridge formation is a slowdown and/or standstill in the descent of the material that has been received by the device for inductive heating. Because the melting process is disturbed by the bridging, the upper, refilled material does not melt at the same speed as if no bridge had formed. By observing the development over time of the sinking behaviour of the metal material received by the device for inductive heating, it is therefore possible to conclude that bridging has taken place.

In particular, the evaluation device can be configured to recognize flat areas of a measurement curve in a diagram that has time as the abscissa axis and values for the fill level as the ordinate axis. A time window can also be predefined, whereby a curve area is categorized as a "flat area" if the recorded distance values or the value for the corresponding temporal development of the fill level remain essentially constant over the entirety of this time window. If a flat area is recognized, further parameters are preferably used to determine whether bridging is present.

In a further embodiment of the method, preset and/or recorded values for at least one operating parameter of the device for inductive heating are retrieved as a function of the temporal development of the fill level and taken into account for the detection of bridging.

By taking into account other parameters in the melting process on the device for inductive heating as a set value and/or as an actual value, the determination of the presence of bridging can be performed with increased reliability.

If, for example, a flat area has been recognized in a time/distance measurement curve, it can be checked whether the device for inductive heating has just been filled for the first time or whether the metal material received by the device for inductive heating is at the start of the melting process. If this is the case, then the metal material is comparatively cold and should first be brought to a melting temperature before it sinks due to melting. It can therefore be assumed that no bridging has taken place.

As a further query for detecting bridging when recognizing a flat area in a measurement curve, the power of the device for inductive heating can be checked. If the device for inductive heating is switched off or the power is greatly reduced, the melting process is interrupted and slows down, but this is not due to bridging.

As a further query, the ratio between the energy at which the metal material absorbed by the device for inductive heating melts and the energy already supplied by the device for inductive heating can be checked. Preferably, a limit value for this ratio is predetermined at which it can be assumed that bridging has occurred.

In the context of the invention, it was established that the fill level remains essentially constant over a predefined time window, that the melting process has already started, that the power of the device for inductive heating does not correspond to a switch-off state or a throttled state of the device for inductive heating, and also that the energy already supplied exceeds a certain reference value, then the existence of bridging is affirmed.

The order of these queries can be changed as required or the queries can be interchanged with each other as required as part of an evaluation procedure.

The at least one preset and/or detected value for an operating parameter of the device for inductive heating can be a value for a weight, in particular a weight for a receiving chamber of the device for inductive heating loaded with the metal material, a decrease in the power of the device for inductive heating, a weight for the metal material received by the device for inductive heating, a temperature, in particular a temperature for the metal material received by the device for inductive heating, or an energy that has already been supplied.

In this way, the detection of the presence of bridging can be ensured with increased reliability. In particular, the energy to be supplied for melting the metal material or the ratio between the melting energy and the energy already supplied can be calculated using the weight of the device for inductive heating in a filled state and/or using a weight for the metal material received by the device for inductive heating.

In a further embodiment of the method, if the signal contains information about a positive detection of bridging, the supply of metal material to the device for inductive heating is at least temporarily reduced or stopped and/or a warning signal is emitted.

This can prevent the device for inductive heating from being filled further if it is detected that a bridge is present or that the metal material already received by the device for inductive heating is no longer sinking. In addition, the operating personnel may be warned that a bridge has formed in the metal material received by the device for inductive heating.

The feed can be stopped or interrupted as long as a bridge is present and then resumed when there is no longer a bridge and the metal material received by the device for inductive heating sinks as intended due to the melting process.

According to the invention, the above-mentioned task is also solved by a control system for a device for inductive heating of a metal material with a device according to one of the embodiments described above and with a control unit in that the control unit is configured to regulate or control the supply of metal material to the device for inductive heating as a function of a fill level of the device for inductive heating.

This control system can also be used to adaptively control or regulate the supply of bulk material or metal material to be melted.

The control unit can preferably be connected to the evaluation device of the device for monitoring a device for inductive heating via a communication connection. This communication connection can be established by cable or wirelessly. In this way, information can be exchanged, for example about the presence of a bridge or about bridging.

In addition, the control unit can be configured to control a conveying device for feeding metal material to a device for inductive heating as a function of information about a fill level output by the evaluation device. Further preferably, the control unit is configured to at least temporarily reduce or prevent the supply of metal material or bulk material to the device for inductive heating if the presence of bridging is positively recognized.

In a first embodiment of the control system, the control unit is configured to initiate at least partial loading of the device for inductive heating by a transport device, in particular by a charging trolley or by a movable transport chute, if the fill level falls below a predetermined lower limit value, and/or to pause or stop if the fill level exceeds a predetermined upper limit value.

In addition, the control system may include a control device for setting and/or detecting at least one operating parameter of the device for inductive heating, in particular an energy supply, a power consumption and/or a temperature. The control device is preferably configured to provide at least one set and/or detected value for an operating parameter for recognizing bridging in the metal material received by the device for inductive heating.

With a control system of this type, the sinking behaviour of the metal material being received and other operating parameters can be used to determine the presence of bridging. The device for inductive heating can also be controlled or regulated depending on this determination.

In addition to the embodiments described above, the signal which is dependent on the detection of bridging and which is output by the evaluation device can be used to adaptively control or regulate a setpoint value for all operating parameters of the device for inductive heating. A non-exhaustive list of examples of this is: the supply of metal material to the device for inductive heating, an energy supplied by the device for inductive heating, a temperature and/or a weight for a metal material to be melted.

The above task is also solved by a computer program for a device for monitoring the fill level of a device for inductive heating of a metal material, the execution of which program on a processor of the device for monitoring the fill level causes a method according to one of the embodiments described above to be carried out.

The embodiments of the device for monitoring the fill level of a device for induction heating of a metal material, the method for automatically loading a device for induction heating of a metal material and the control system for a device for induction heating of a metal material can be combined with one another as desired.

BRIEF DESCRIPTION OF THE DRAWINGS

Further advantages of the features of the invention are apparent from the description of the following embodiments, with reference being made to the accompanying drawing. The drawings.

DESCRIPTION OF THE INVENTION

Figure 1:
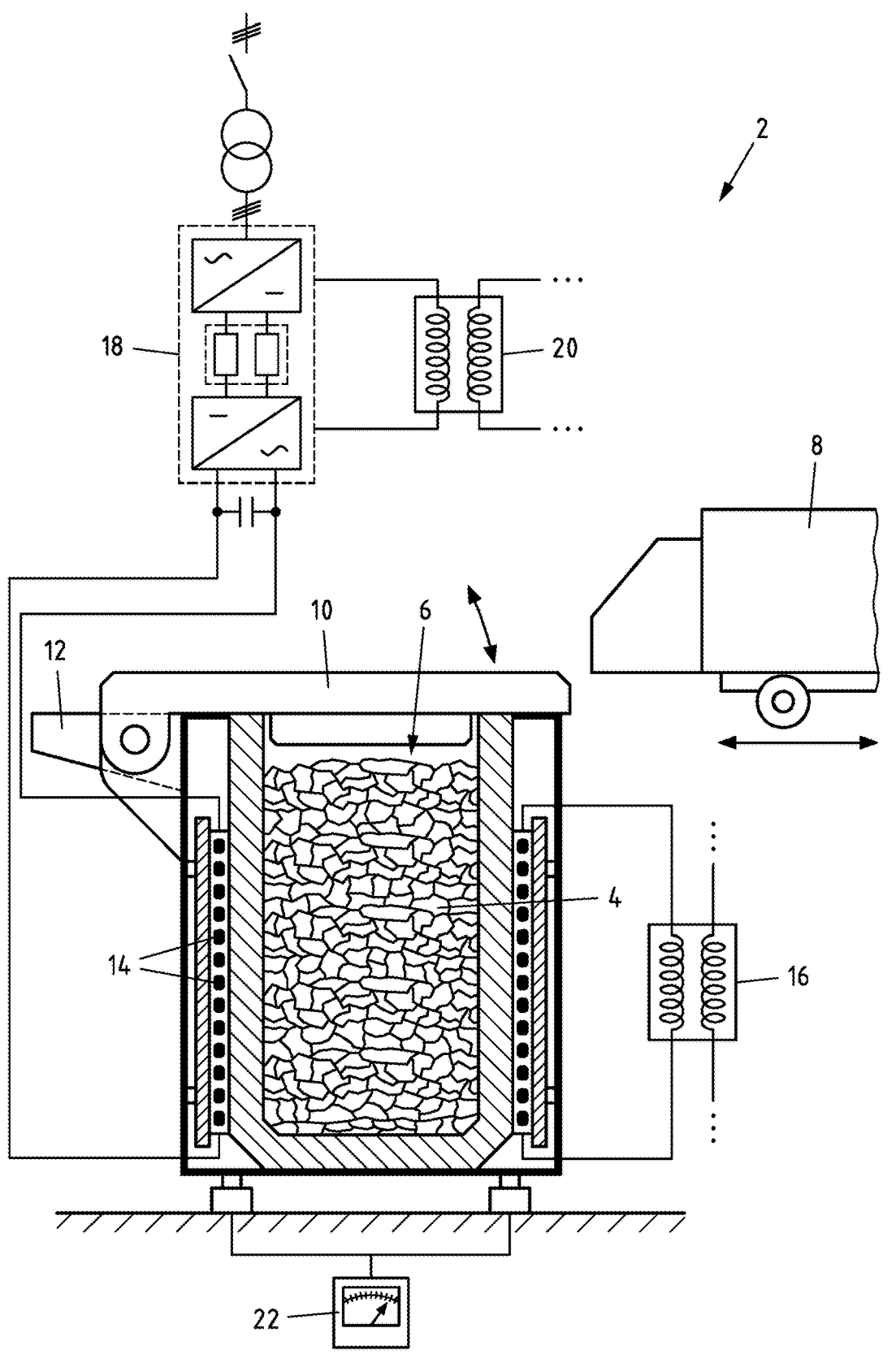
FIG. 1 shows an example of a device for induction heating of a metal material.

FIG. 1 shows an example of an apparatus 2 for induction heating of a metal material 4 from the prior art with a receiving chamber 6 for receiving a bulk material to be melted in the form of scrap pieces of metal material 4 and with a conveying device 8 for filling the receiving chamber 6. The conveying device 8 is designed as a charging trolley. Depending on the position of a suction bonnet 10, the receiving chamber 6 is available for filling or refilling by means of a pouring section 12 designed as a tapping spout.

A coil 14 is wound around the receiving chamber 6, which is connected on the one hand to a cooling system 16 and on the other hand to a medium-frequency converter (MF converter) 18. The MF converter 18 is in turn tempered by a further cooling system 20.

A weighing cell 22 is used to monitor the weight of the receiving chamber 6.

Figure 2:
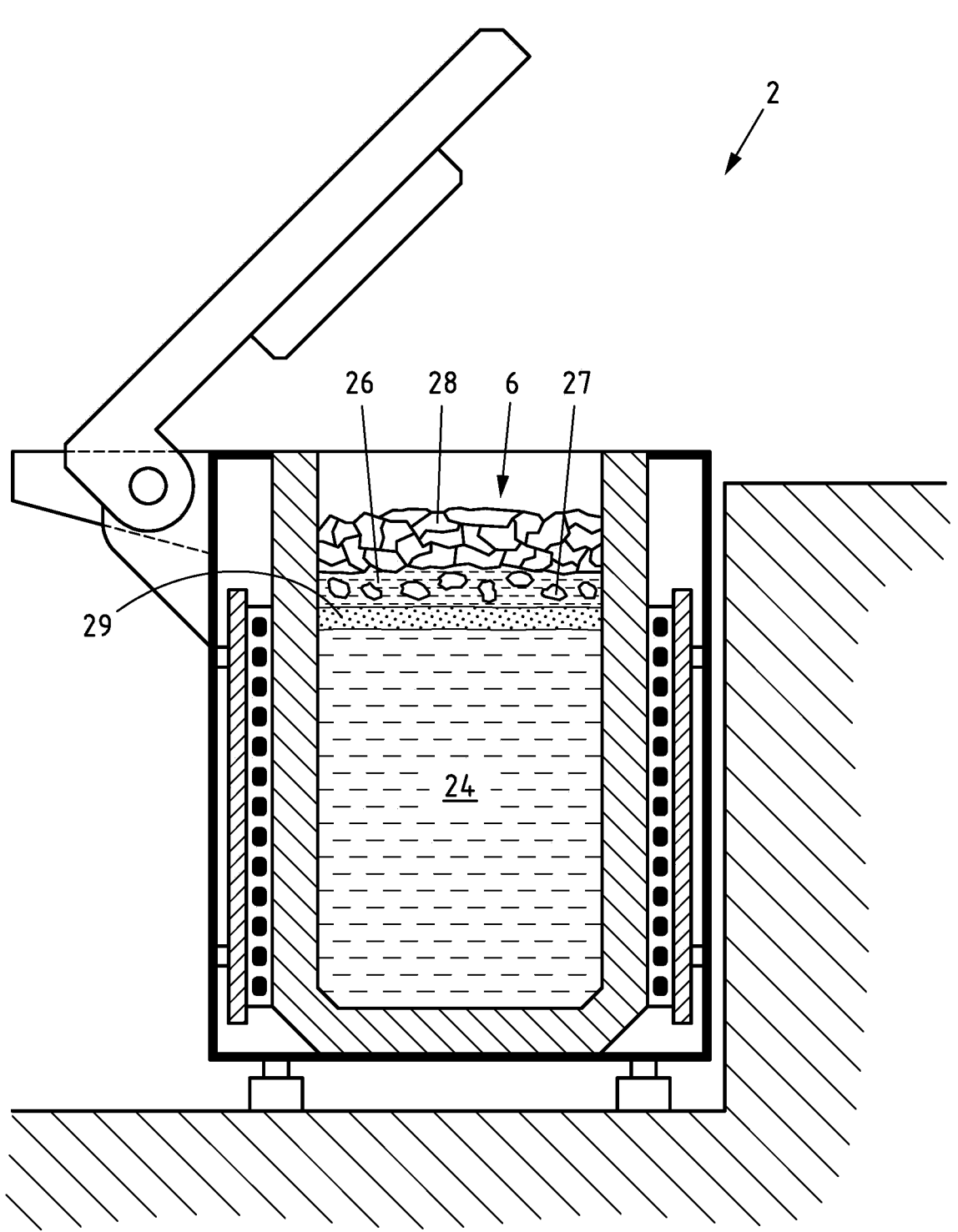
FIG. 2 shows detailed view of the device shown in FIG. 1, showing bridging in the metal material being received.

FIG. 2 shows a detailed view of the device 2 from FIG. 1, wherein bridging has taken place in the received metal material. The receiving chamber 6 can be seen, in which a metal material is partially melted. A layer 26 of a solidified, non-metallic accompanying phase or slag has formed above the melt 24, for example as a result of a previous melting process. Solid individual pieces 27 or scrap components from a metal material 28 to be melted lie above this layer 26. The layer 26 has hard individual pieces 27 that have not yet melted.

The centre layer 26 forms an airtight seal between the melt 24 and the metal material 28 that is still to be melted and prevents the latter from melting. A space 29 containing gases from the melting process has formed between the layer 26 and the melt 24, which cannot escape due to the airtight layer 26.

Figure 3:
FIG. 3 shows an embodiment of a device for monitoring a device for inductive heating of a metal material.

FIG. 3 shows an embodiment of a device for monitoring 30 a device for inductive heating 32 of a metal material 34 with a detection device 36 and with an evaluation device 38.

The detection device 36 is designed as an optical sensor for time-resolved detection of a distance and output of corresponding distance values. The detection device 36 successively emits a plurality of fanned-out light pulses 40, which at least partially reflect onto the surface 42 of the metal material 34 received in the receiving space 44 of the device for inductive heating 32, and detects the reflected light beams. The detection device 36 calculates the distance to the reflecting surface 42 from the detected light beams or from the time delay between the time of emission of the measuring pulse and the time of detection of the corresponding reflected light beam.

In FIG. 3, the detection device 36 is arranged at the splash guard 46 of a conveyor 48 and connected to the evaluation device 38 via a cable 50.

The evaluation device 38 is designed to determine a fill level of the device for inductive heating 32 on the basis of distance values output by the detection device 36 and to output a signal with information about the determined fill level.

The signal is suitable for further use in a control process, whereby the supply of metal material 34 to the device for inductive heating 32, in this case by means of the conveyor 48, is adjusted taking into account the fill level.

Figure 4:
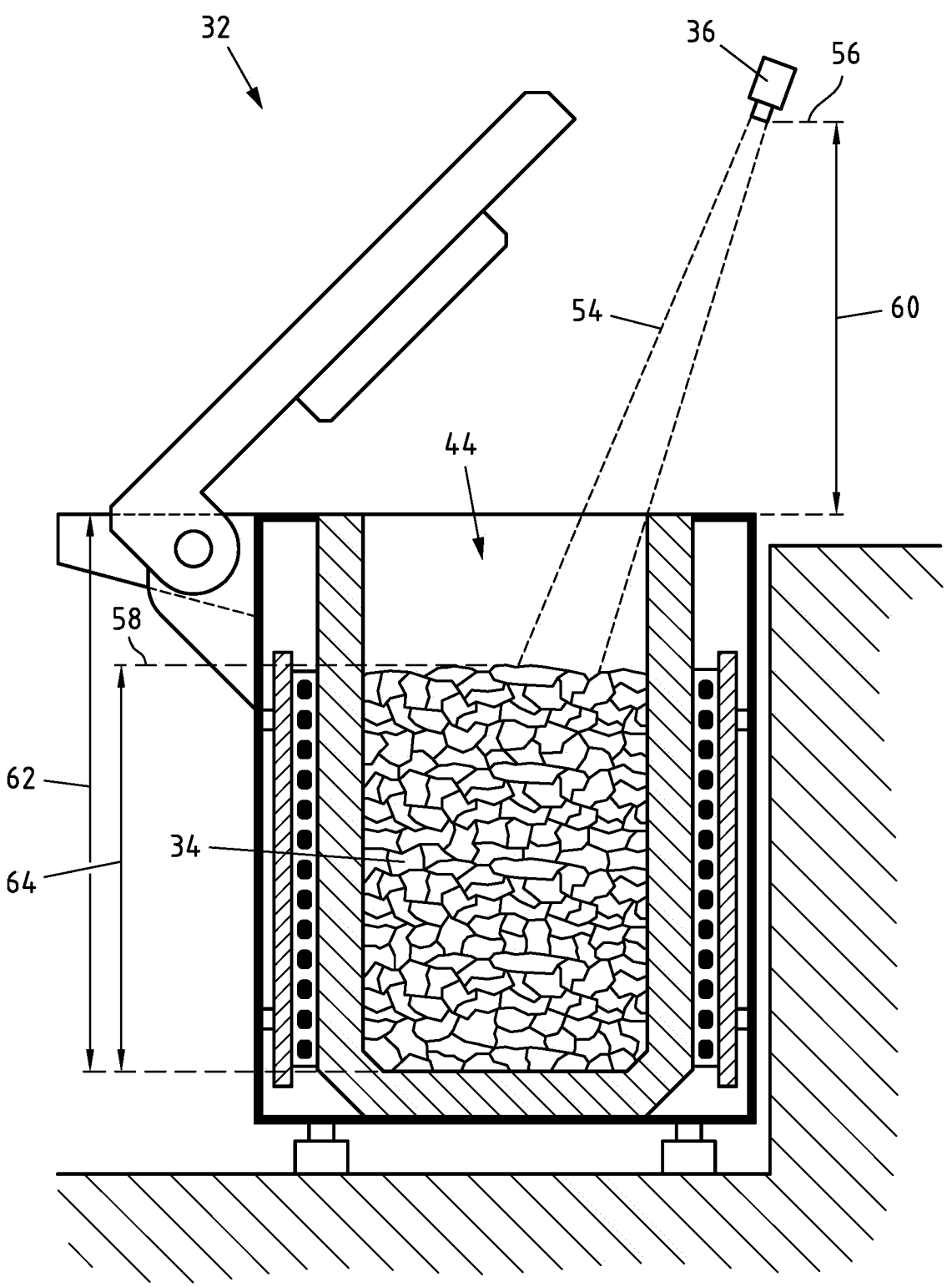
FIG. 4 shows a detailed view of the device from FIG. 3.

FIG. 4 shows a detailed view of the device 32 of FIG. 3, with the detected distances shown schematically. The detection device 36 is arranged above the receiving space 44 of the device for inductive heating 32 and can thus detect distances that correspond to the total height of the receiving space 44.

By emitting a measurement pulse 54 and detecting a corresponding reflected light beam, the distance between the position 56 at which the measurement pulse was emitted and the position 58 at which it was reflected on the free surface of the metal material 34 received by the receiving space 44 can be determined. In the present case, (i) the distance 60 between the position 56 at which measuring pulses are emitted and the position of the edge of the upper opening of the receiving chamber of the device for inductive heating 32 and (ii) the height 62 of the interior of the receiving chamber 44 were stored in advance, so that the fill level 64 or the filling height in the receiving chamber 44 can be determined on the basis of the recorded values and by simple subtraction.

Figure 5:
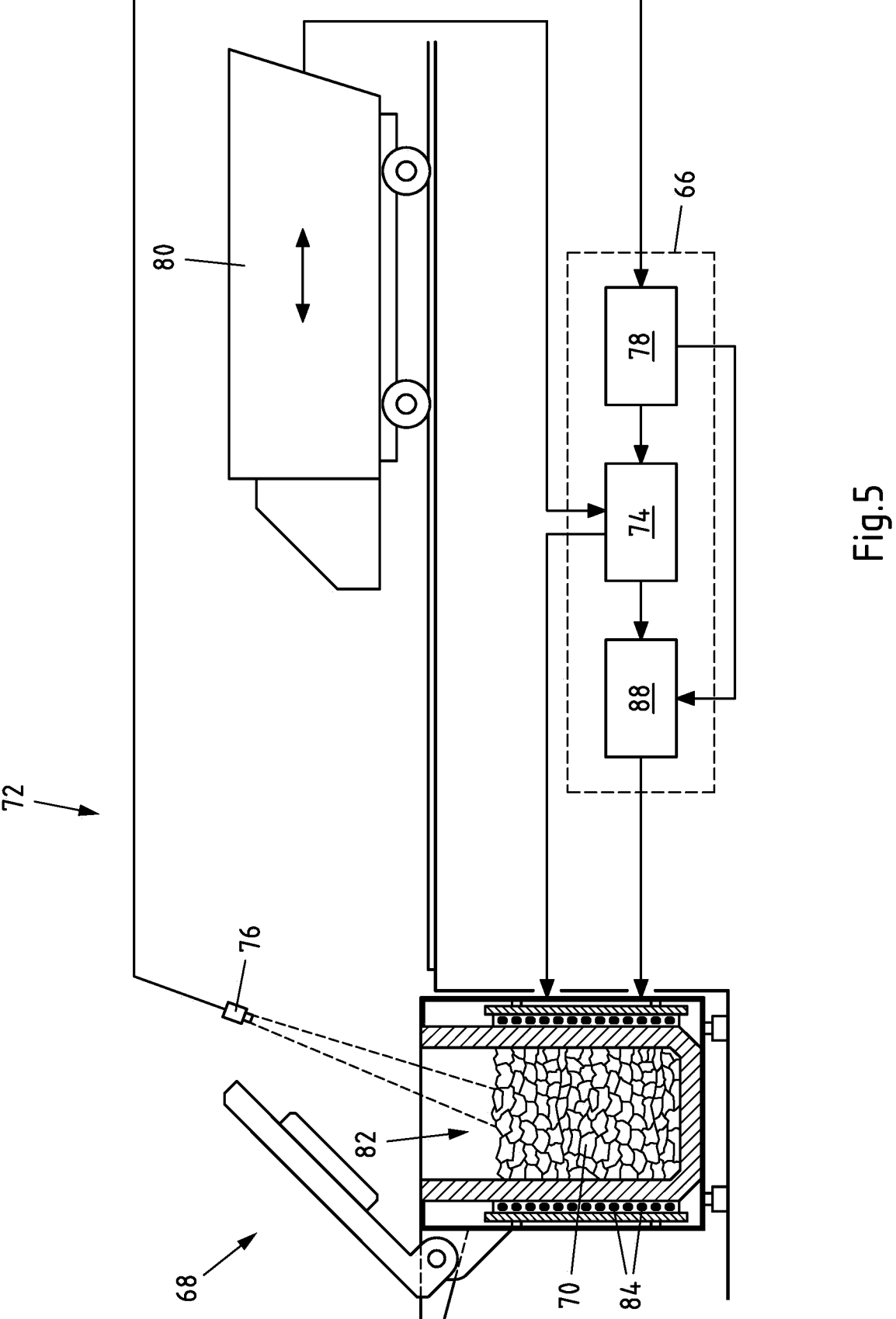
FIG. 5 shows an embodiment of a control system for a device for inductive heating of a metal material.

FIG. 5 shows an embodiment of a control system 66 for a device 68 for inductive heating of a metal material 70, with a device for monitoring 72 a device 68 for inductive heating of a metal material 70 and with a control unit 74.

The device for monitoring 72 has a detection device 76 and an evaluation device 78. The evaluation device 78 is connected to the control unit 74 for data exchange.

The control unit 74 is connected to a conveying device 80 of the device for inductive heating 68 to adaptively control the supply of metal material 70 to the receiving space 82 of the device for inductive heating 68 in dependence on information or signals received from the evaluation device 78. In addition, the control unit 74 is also connected to a coil 84 of the device for inductive heating 68 to control the energy supplied to the received metal material 70.

Furthermore, a control device 88 is provided, which is connected to the evaluation device 78. This control device 88 corresponds to the control device that is provided as standard in devices for induction heating. The configuration shown in FIG. 5 could also be used to retrofit an existing device for inductive heating 68 by adding a control system 66.

The control device 88 is configured to set all operating parameters of the device for inductive heating 68 and also to detect actual values for these operating parameters. Through the respective connections of the evaluation device 78, the control unit 74 and the control device 88, it is possible to determine the presence of bridging in the metal material 70 on the basis of both distance values output by the detection device 76 to the fill level of the receiving chamber 82 and values for operating parameters.

The invention claimed is:

1. A device for monitoring a device for inductive heating of a metal material during the filling of the device for induction heating with a detection device and with an evaluation device, wherein the detection device is a LIDAR sensor for detecting a distance, the detection device being configured to emit beams in the ultraviolet, infrared or visible range of light and to determine a distance value for a distance to be measured at a specific measurement time on the basis of a transit time of a measurement pulse between emission and reception after reflection, the detection device further configured such that several measuring pulses are emitted simultaneously and sent in the direction of a free surface of the metal material in order to observe a sinking behavior of several positions on the free surface of the metal material, and the evaluation device being configured to determine a fill level of the device for inductive heating on the basis of a distance detected by the detection device and to output a corresponding signal; wherein said corresponding signal being suitable for further use in a control process for a supply of metal material to the device for inductive heating; and wherein several distance values corresponding to several distances detected at the same time are taken into account in order to detect bridging in the metal material received by the device for inductive heating.

2. The device according to claim 1, wherein the detection device is configured for time-resolved detection of a distance and output of corresponding distance values, and in that the evaluation device is configured to trace a temporal development of the fill level on the basis of the distance values output by the detection device.

3. The device according to claim 1, wherein the fill level for a specific point in time corresponds to a distance between a reference position fixed relative to the device for inductive heating and a position on a free surface of the metal material received by the device for inductive heating at the specific point in time.

4. The device according to claim 1, wherein the evaluation device is further configured for accessing at least one preset and/or detected value for an operating parameter of the device for inductive heating, and in that the evaluation device is configured for recognising bridging in the metal material received by the device for inductive heating, taking into account a temporal development of the fill level and of the at least one preset and/or detected value for the operating parameter of the device for inductive heating.

5. The device according to claim 4, wherein the signal output by the evaluation device is suitable for further use by a warning device, and in that the warning device is configured for outputting a warning signal if the signal output by the evaluation device contains information about a positive detection of bridging.

6. The device according to claim 1, wherein the detection device is arranged at a conveying device for supplying metal material to the device for inductive heating.

7. A control system for an apparatus for induction heating of a metal material comprising an apparatus according to claim 1 and a control unit, wherein the control unit is configured to regulate or control the supply of metal material to the device for induction heating as a function of a fill level of the device for induction heating.

8. The control system according to claim 7, wherein the control unit is configured to cause at least partial loading of the device for inductive heating by a conveying device when the fill level falls below a predetermined lower limit value, and/or to pause or stop when the fill level exceeds a predetermined upper limit value.

* * * * *